(12) United States Patent
Dittrich et al.

(10) Patent No.: US 11,712,792 B2
(45) Date of Patent: Aug. 1, 2023

(54) SETTING TOOL

(71) Applicant: HILTI AKTIENGESELLSCHAFT, Schaan (LI)

(72) Inventors: Tilo Dittrich, Feldkirch (AT); Thomas Sperrfechter, Grüsch (CH); Norbert Heeb, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 243 days.

(21) Appl. No.: 17/051,638

(22) PCT Filed: May 29, 2019

(86) PCT No.: PCT/EP2019/063931
§ 371 (c)(1),
(2) Date: Oct. 29, 2020

(87) PCT Pub. No.: WO2019/233845
PCT Pub. Date: Dec. 12, 2019

(65) Prior Publication Data
US 2021/0060750 A1    Mar. 4, 2021

(30) Foreign Application Priority Data
Jun. 6, 2018   (EP) ..................................... 18176194

(51) Int. Cl.
*B25C 1/06* (2006.01)
*H02K 17/16* (2006.01)
*H02K 7/14* (2006.01)

(52) U.S. Cl.
CPC .............. *B25C 1/06* (2013.01); *H02K 7/145* (2013.01); *H02K 17/165* (2013.01)

(58) Field of Classification Search
CPC ......... B25C 1/06; H02K 7/145; H02K 17/165
See application file for complete search history.

(56) References Cited

U.S. PATENT DOCUMENTS 3,766,455 A * 10/1973 Zakrewsky ............... B25C 1/06
318/135
3,811,313 A *  5/1974 Schut ....................... B21J 15/24
83/575

(Continued)

FOREIGN PATENT DOCUMENTS

DE       2238440 A1    2/1974
DE       3038857 A1    4/1981

OTHER PUBLICATIONS

International Bureau, International Search Report in International Application No. PCT/EP2019/063931, dated Jul. 29, 2019.

*Primary Examiner* — Nathaniel C Chukwurah
*Assistant Examiner* — Lucas E. A. Palmer
(74) *Attorney, Agent, or Firm* — Leydig, Voit & Mayer, Ltd.

(57) ABSTRACT

A setting tool for driving fastening elements into a substrate, comprising a holder for holding a fastening element; a drive-in element for transferring a fastening element held in the holder into the substrate along a setting axis; and a drive for driving the drive-in element toward the fastening element along the setting axis, wherein the drive comprises an electrical capacitor; a squirrel-cage rotor arranged on the drive-in element; and an excitation coil; which during discharge of the capacitor is flowed through by current and generates a magnetic field that accelerates the drive-in element toward the fastening element, wherein the setting tool further comprises a soft-magnetic frame, in which the excitation coil is embedded; and a supporting structure; wherein, at least during the discharge of the capacitor, the supporting structure exerts on the soft-magnetic frame a pretensioning force directed radially inward with respect to the setting axis.

17 Claims, 3 Drawing Sheets

(56) References Cited

U.S. PATENT DOCUMENTS

Figure 1:
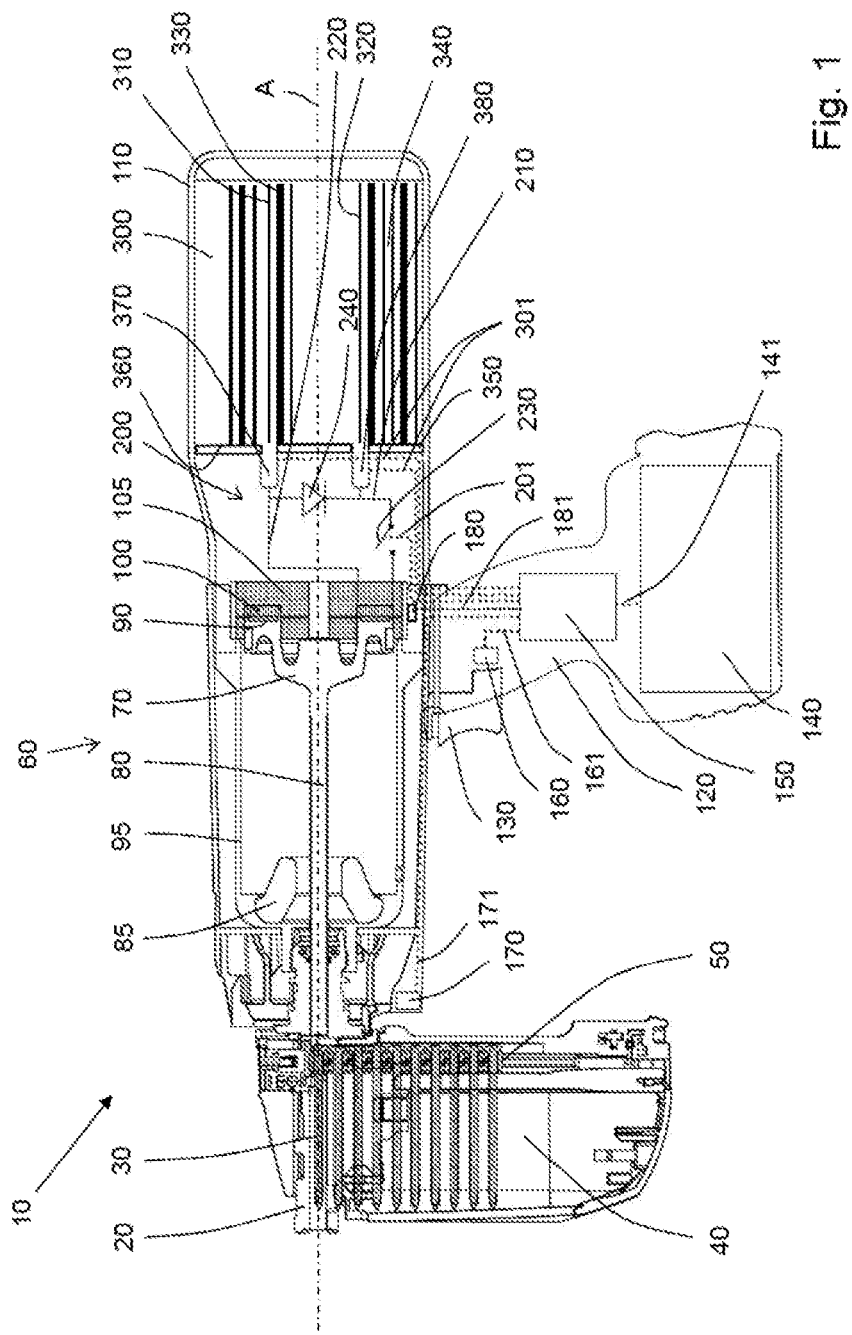

| | | | | |
|---|---|---|---|---|
| 3,924,789 A * | 12/1975 | Avery | B25C 1/06 | 227/132 |
| 4,183,453 A * | 1/1980 | Barrett | B25C 5/15 | 227/120 |
| 4,215,297 A * | 7/1980 | Jacquemet | B25D 11/064 | 318/132 |
| 4,293,088 A * | 10/1981 | Barrett | B25C 1/06 | 227/120 |
| 4,573,624 A * | 3/1986 | Muller | H01F 7/088 | 227/8 |
| 5,079,983 A * | 1/1992 | Bruhn | B30B 1/42 | 83/575 |
| 5,280,673 A * | 1/1994 | Zieve | B21J 15/24 | 72/430 |
| 5,471,865 A * | 12/1995 | Michalewski | B21J 15/24 | 29/243.54 |
| 5,809,157 A * | 9/1998 | Grumazescu | H04R 9/063 | 335/229 |
| 6,830,173 B2 * | 12/2004 | Barber | B25C 1/06 | 173/217 |
| 2003/0183670 A1 * | 10/2003 | Barber | B25C 1/06 | 227/131 |
| 2005/0167465 A1 * | 8/2005 | Llewellyn | B25C 5/15 | 173/117 |
| 2007/0215667 A1 * | 9/2007 | Huang | B25C 1/00 | 227/11 |
| 2008/0061105 A1 * | 3/2008 | Zachrisson | B25C 1/06 | 320/132 |
| 2008/0185418 A1 * | 8/2008 | Gross | B25C 1/06 | 173/90 |
| 2008/0272170 A1 * | 11/2008 | Huang | B25C 1/06 | 227/107 |
| 2010/0032468 A1 * | 2/2010 | Gross | B25C 1/06 | 227/156 |
| 2013/0334277 A1 * | 12/2013 | Shima | B25C 1/06 | 318/114 |
| 2016/0303723 A1 * | 10/2016 | Franz | B25F 5/021 | |
| 2018/0141198 A1 * | 5/2018 | Fan | B25C 1/008 | |

* cited by examiner

SETTING TOOL

CROSS-REFERENCE TO RELATED APPLICATIONS

This patent application is the U.S. National Stage of International Patent Application No. PCT/EP2019/063931, filed May 29, 2019, which claims the benefit of European Patent Application No. 18176194.1, filed Jun. 6, 2018, which are each incorporated by reference.

The present invention relates to a setting tool for driving fastening elements into a substrate.

Such setting tools usually have a holder for a fastening element, from which a fastening element held therein is transferred into the substrate along a setting axis. For this, a drive-in element is driven toward the fastening element along the setting axis by a drive.

U.S. Pat. No. 6,830,173 B2 discloses a setting tool with a drive for a drive-in element. The drive has an electrical capacitor and a coil. For driving the drive-in element, the capacitor is discharged via the coil, whereby a Lorentz force acts on the drive-in element, so that the drive-in element is moved toward a nail.

The object of the present invention is to provide a setting tool of the aforementioned type with which high efficiency and/or good setting quality are ensured.

The object is achieved by a setting tool for driving fastening elements into a substrate, comprising a holder, which is provided for holding a fastening element, a drive-in element, which is provided for transferring a fastening element held in the holder into the substrate along a setting axis, and a drive, which is provided for driving the drive-in element toward the fastening element along the setting axis, wherein the drive comprises an electrical capacitor, a short-circuit runner arranged on the drive-in element and an excitation coil, which during discharge of the capacitor is flowed through by current and generates a magnetic field that accelerates the drive-in element toward the fastening element, wherein the setting tool further comprises a soft-magnetic frame, in which the excitation coil is embedded, and a supporting structure, such as a supporting element, wherein, at least during the discharge of the capacitor, the supporting structure exerts on the soft-magnetic frame a pretensioning force that is directed radially inward with respect to the setting axis. The setting tool can in this case preferably be used in a hand-held manner. Alternatively, the setting tool can be used in a stationary or semi-stationary manner.

In the context of the invention, a capacitor should be understood as meaning an electrical component that stores electrical charge and the associated energy in an electrical field. In particular, a capacitor has two electrically conducting electrodes, between which the electrical field builds up when the electrodes are electrically charged differently. In the context of the invention, a fastening element should be understood as meaning for example a nail, a pin, a clamp, a clip, a stud, in particular a threaded bolt, or the like.

An advantageous embodiment is characterized in that the supporting structure exerts a pretensioning force on the soft-magnetic frame from all sides within a plane perpendicular to the setting axis.

An advantageous embodiment is characterized in that the supporting structure exerts a pretensioning force on the soft-magnetic frame in the direction of the setting axis.

An advantageous embodiment is characterized in that the supporting structure substantially encloses the soft-magnetic frame. The supporting structure is preferably elastically stretched in the peripheral direction with respect to the setting axis. The soft-magnetic frame is particularly preferably inserted into a recess in the supporting structure. The supporting structure is likewise particularly preferably tensioned around the soft-magnetic frame by means of a tensioning element, for example a screw.

An advantageous embodiment is characterized in that the supporting structure is molded onto the soft-magnetic frame, preferably by means of an injection-molding process.

An advantageous embodiment is characterized in that the soft-magnetic frame has a lateral surface facing radially outward with respect to the setting axis and the supporting structure has a supporting surface facing radially inward with respect to the setting axis, which lies flat against the lateral surface, the pretensioning force being transferred from the supporting surface onto the lateral surface.

The lateral surface and the supporting surface are preferably cylindrical, particularly preferably circular-cylindrical. Likewise preferably, the lateral surface and the supporting surface are conical. Particularly preferably, the lateral surface and the supporting surface taper in a direction away from the drive-in element. Likewise particularly preferably, the conical shape of the lateral surface and the supporting surface has a cone opening angle of at most 90°, preferably at most 60°. Likewise particularly preferably, the setting tool comprises a tensioning device, which pretensions the supporting structure axially with respect to the setting axis against the soft-magnetic frame.

An advantageous embodiment is characterized in that a material of the supporting structure comprises a metal or an alloy, preferably steel. The material of the supporting structure preferably consists of the metal or the alloy.

An advantageous embodiment is characterized in that a material of the supporting structure comprises ceramic. The material of the supporting structure preferably consists of ceramic.

An advantageous embodiment is characterized in that a material of the supporting structure comprises a preferably fiber-reinforced plastic. The material of the supporting structure preferably consists of the plastic.

Figure 2:
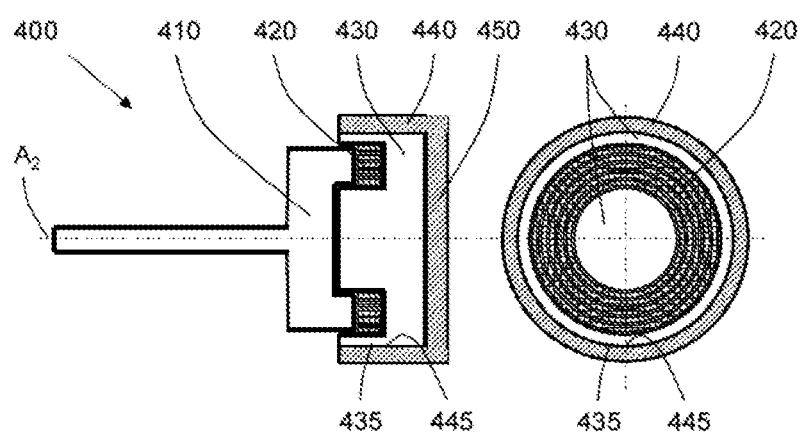
Figure 3:
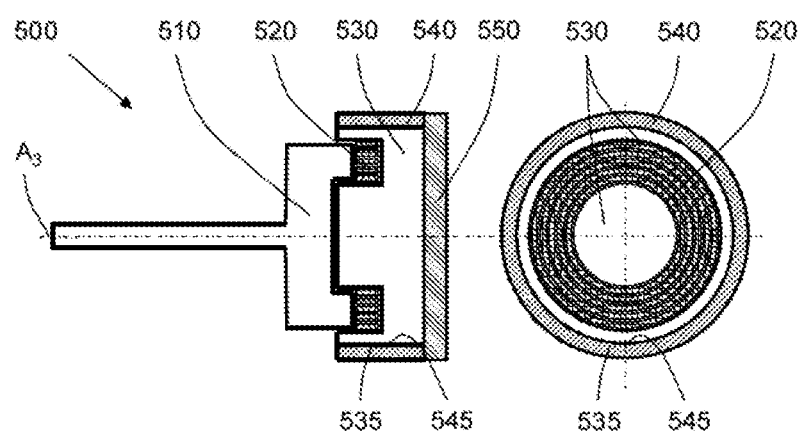
Figure 4:
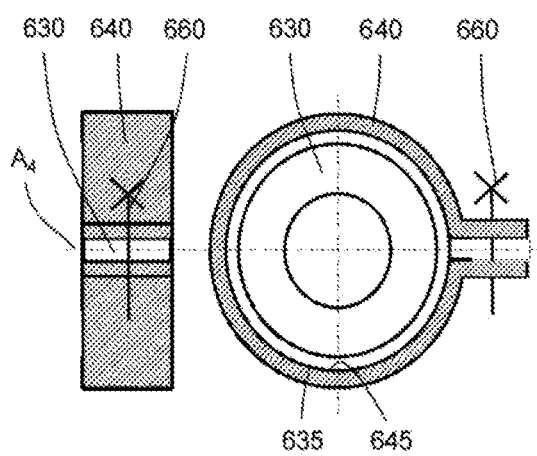
Figure 5:
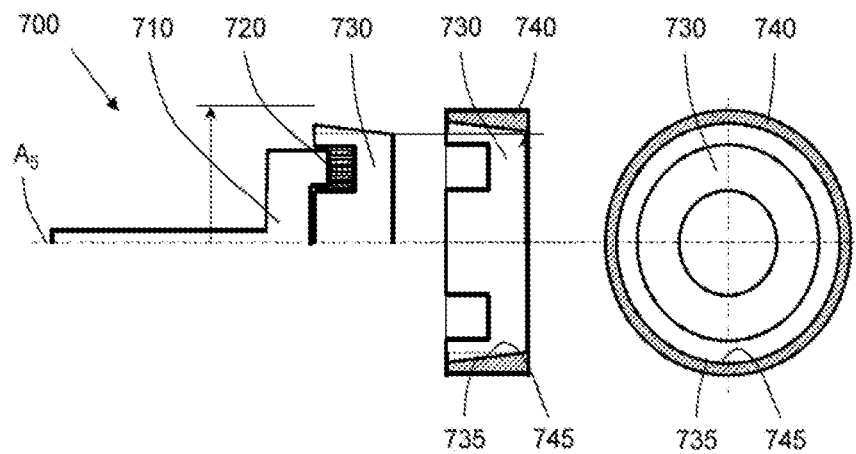
Figure 6:
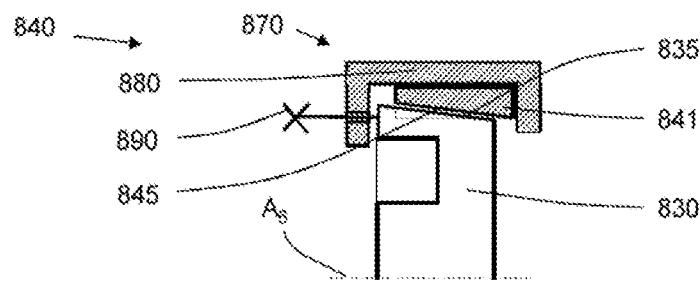

The invention is represented in a number of exemplary embodiments in the drawings, in which:

FIG. 1 shows a longitudinal section through a setting tool,

FIG. 2 shows a longitudinal section and a cross section through a setting tool in the form of a detail, FIG. 3 shows a longitudinal section and a cross section through a setting tool in the form of a detail, FIG. 4 shows a side view and a plan view of a supporting structure, FIG. 5 shows a longitudinal section and a cross section through a setting tool in the form of a detail and FIG. 6 shows a longitudinal section through a supporting structure.

FIG. 1 illustrates a hand-held setting tool 10 for driving fastening elements into a substrate that is not shown. The setting tool 10 has a holder 20 formed as a stud guide, in which a fastening element 30, which is formed as a nail, is held in order to be driven into the substrate along a setting axis A (on the left in FIG. 1). For the purpose of supplying fastening elements to the holder, the setting tool 10 comprises a magazine 40 in which the fastening elements are held in store individually or in the form of a fastening element strip 50 and are transported to the holder 20 one by one. To this end, the magazine 40 has a spring-loaded feed element, not specifically denoted. The setting tool 10 has a drive-in element 60, which comprises a piston plate 70 and a piston rod 80. The drive-in element 60 is provided for transferring the fastening element 30 out of the holder 20 along the setting axis A into the substrate. In the process, the drive-in element 60 is guided with its piston plate 70 in a guide cylinder 95 along the setting axis A.

The drive-in element 60 is, for its part, driven by a drive, which comprises a short-circuit runner 90 arranged on the piston plate 70, an excitation coil 100, a soft-magnetic frame 105, a switching circuit 200 and a capacitor 300 with an internal resistance of 5 mohms. The short-circuit runner 90 consists of a preferably ring-like, particularly preferably circular ring-like, element with a low electrical resistance, for example made of copper, and is fastened, for example soldered, welded, adhesively bonded, clamped or connected in a form-fitting manner, to the piston plate 70 on the side of the piston plate 70 that faces away from the holder 20. In exemplary embodiments which are not shown, the piston plate itself is formed as a short-circuit runner. The switching circuit 200 is provided for causing rapid electrical discharging of the previously charged capacitor 300 and conducting the thereby flowing discharge current through the excitation coil 100, which is embedded in the frame 105. The frame preferably has a saturation flux density of at least 1.0 T and/or an effective specific electrical conductivity of at most $10^6$ S/m, so that a magnetic field generated by the excitation coil 100 is intensified by the frame 105 and eddy currents in the frame 105 are suppressed.

In a ready-to-set position of the drive-in element 60 (FIG. 1), the drive-in element 60 enters with the piston plate 70 a ring-like recess, not specifically denoted, of the frame 105 such that the short-circuit runner 90 is arranged at a small distance from the excitation coil 100. As a result, an excitation magnetic field, which is generated by a change in an electrical excitation current flowing through the excitation coil, passes through the short-circuit runner 90 and, for its part, induces in the short-circuit runner 90 a secondary electrical current, which circulates in a ring-like manner. This secondary current, which builds up and therefore changes, in turn generates a secondary magnetic field, which opposes the excitation magnetic field, as a result of which the short-circuit runner 90 is subject to a Lorentz force, which is repelled by the excitation coil 100 and drives the drive-in element 60 toward the holder 20 and also the fastening element 30 held therein.

The setting tool 10 further comprises a housing 110, in which the drive is held, a handle 120 with an operating element 130 formed as a trigger, an electrical energy store 140 formed as a rechargeable battery, a control unit 150, a tripping switch 160, a contact-pressure switch 170, a means for detecting a temperature of the excitation coil 100, formed as a temperature sensor 180 arranged on the frame 105, and electrical connecting lines 141, 161, 171, 181, 201, 301, which connect the control unit 150 to the electrical energy store 140, to the tripping switch 160, to the contact-pressure switch 170, to the temperature sensor 180, to the switching circuit 200 and, respectively, to the capacitor 300. In exemplary embodiments which are not shown, the setting tool 10 is supplied with electrical energy by means of a power cable instead of the electrical energy store 140 or in addition to the electrical energy store 140. The control unit comprises electronic components, preferably interconnected on a printed circuit board to form one or more electrical control circuits, in particular one or more microprocessors.

When the setting tool 10 is pressed against a substrate that is not shown (on the left in FIG. 1), a contact-pressure element, not specifically denoted, operates the contact-pressure switch 170, which as a result transmits a contact-pressure signal to the control unit 150 by means of the connecting line 171. This triggers the control unit 150 to initiate a capacitor charging process, in which electrical energy is conducted from the electrical energy store 140 to the control unit 150 by means of the connecting line 141 and from the control unit 150 to the capacitor 300 by means of the connecting lines 301, in order to charge the capacitor 300. To this end, the control unit 150 comprises a switching converter, not specifically denoted, which converts the electric current from the electrical energy store 140 into a suitable charge current for the capacitor 300. When the capacitor 300 is charged and the drive-in element 60 is in its ready-to-set position illustrated in FIG. 1, the setting tool 10 is in a ready-to-set state. Since charging of the capacitor 300 is only implemented by the setting tool 10 pressing against the substrate, to increase the safety of people in the area a setting process is only made possible when the setting tool 10 is pressed against the substrate. In exemplary embodiments which are not shown, the control unit already initiates the capacitor charging process when the setting tool is switched on or when the setting tool is lifted off the substrate or when a preceding driving-in process is completed.

When the operating element 130 is operated, for example by being pulled using the index finger of the hand which is holding the handle 120, with the setting tool 10 in the ready-to-set state, the operating element 130 operates the tripping switch 160, which as a result transmits a tripping signal to the control unit 150 by means of the connecting line 161. This triggers the control unit 150 to initiate a capacitor discharging process, in which electrical energy stored in the capacitor 300 is conducted from the capacitor 300 to the excitation coil 100 by means of the switching circuit 200 by way of the capacitor 300 being discharged.

To this end, the switching circuit 200 schematically illustrated in FIG. 1 comprises two discharge lines 210, 220, which connect the capacitor 300 to the excitation coil 200 and at least one discharge line 210 of which is interrupted by a normally open discharge switch 230. The switching circuit 200 forms an electrical oscillating circuit with the excitation coil 100 and the capacitor 300. Oscillation of this oscillating circuit back and forth and/or negative charging of the capacitor 300 may potentially have an adverse effect on the efficiency of the drive, but can be suppressed with the aid of a free-wheeling diode 240. The discharge lines 210, 220 are electrically connected, for example by soldering, welding, screwing, clamping or form-fitting connection, to in each case one electrode 310, 320 of the capacitor 300 by means of electrical contacts 370, 380 of the capacitor 300 which are arranged on an end side 360 of the capacitor 300 that faces the holder 20. The discharge switch 230 is preferably suitable for switching a discharge current with a high current intensity and is formed for example as a thyristor. In addition, the discharge lines 210, 220 are at a small distance from one another, so that a parasitic magnetic field induced by them is as low as possible. For example, the discharge lines 210, 220 are combined to form a busbar and are held together by a suitable means, for example a retaining device or a clamp. In exemplary embodiments which are not shown, the free-wheeling diode is connected electrically in parallel with the discharge switch. In further exemplary embodiments which are not shown, there is no free-wheeling diode provided in the circuit.

For the purpose of initiating the capacitor discharging process, the control unit 150 closes the discharge switch 230 by means of the connecting line 201, as a result of which a discharge current of the capacitor 300 with a high current intensity flows through the excitation coil 100. The rapidly rising discharge current induces an excitation magnetic field, which passes through the short-circuit runner 90 and, for its part, induces in the short-circuit runner 90 a secondary electric current, which circulates in a ring-like manner. This secondary current which builds up in turn generates a secondary magnetic field, which opposes the excitation magnetic field, as a result of which the short-circuit runner 90 is subject to a Lorentz force, which is repelled by the excitation coil 100 and drives the drive-in element 60 toward the holder 20 and also the fastening element 30 held therein. As soon as the piston rod 80 of the drive-in element 60 meets a head, not specifically denoted, of the fastening element 30, the fastening element 30 is driven into the substrate by the drive-in element 60. Excess kinetic energy of the drive-in element 60 is absorbed by a braking element 85 made of a spring-elastic and/or damping material, for example rubber, by way of the drive-in element 60 moving with the piston plate 70 against the braking element 85 and being braked by the latter until it comes to a standstill. The drive-in element 60 is then reset to the ready-to-set position by a resetting device that is not specifically denoted.

The capacitor 300, in particular its center of gravity, is arranged behind the drive-in element 60 on the setting axis A, whereas the holder 20 is arranged in front of the drive-in element 60. Therefore, with respect to the setting axis A, the capacitor 300 is arranged in an axially offset manner in relation to the drive-in element 60 and in a radially overlapping manner with the drive-in element 60. As a result, on the one hand a small length of the discharge lines 210, 220 can be realized, as a result of which their resistances can be reduced, and therefore an efficiency of the drive can be increased. On the other hand, a small distance between a center of gravity of the setting tool 10 and the setting axis A can be realized. As a result, tilting moments in the event of recoil of the setting tool 10 during a driving-in process are small. In an exemplary embodiment which is not shown, the capacitor is arranged around the drive-in element.

The electrodes 310, 320 are arranged on opposite sides of a carrier film 330 which is wound around a winding axis, for example by metallization of the carrier film 330, in particular by being vapor-deposited, wherein the winding axis coincides with the setting axis A. In exemplary embodiments which are not shown, the carrier film with the electrodes is wound around the winding axis such that a passage along the winding axis remains. In particular, in this case the capacitor is for example arranged around the setting axis. The carrier film 330 has at a charging voltage of the capacitor 300 of 1500 V a film thickness of between 2.5 μm and 4.8 μm and at a charging voltage of the capacitor 300 of 3000 V a film thickness of for example 9.6 μm. In exemplary embodiments which are not shown, the carrier film is for its part made up of two or more individual films which are arranged as layers one on top of the other. The electrodes 310, 320 have a sheet resistance of 50 ohms/□.

A surface of the capacitor 300 has the form of a cylinder, in particular a circular cylinder, the cylinder axis of which coincides with the setting axis A. A height of this cylinder in the direction of the winding axis is substantially the same size as its diameter, measured perpendicularly to the winding axis. On account of a small ratio of height to diameter of the cylinder, a low internal resistance for a relatively high capacitance of the capacitor 300 and, not least, a compact construction of the setting tool 10 are achieved. A low internal resistance of the capacitor 300 is also achieved by a large line cross section of the electrodes 310, 320, in particular by a high layer thickness of the electrodes 310, 320, wherein the effects of the layer thickness on a self-healing effect and/or on a service life of the capacitor 300 should be taken into consideration.

The capacitor 300 is mounted on the rest of the setting tool 10 in a manner damped by means of a damping element 350. The damping element 350 damps movements of the capacitor 300 relative to the rest of the setting tool 10 along the setting axis A. The damping element 350 is arranged on the end side 360 of the capacitor 300 and completely covers the end side 360. As a result, the individual windings of the carrier film 330 are subject to uniform loading by recoil of the setting tool 10. In this case, the electrical contacts 370, 380 protrude from the end surface 360 and pass through the damping element 350. For this purpose, the damping element 350 in each case has a clearance through which the electrical contacts 370, 380 protrude. The connecting lines 301 respectively have a strain-relief and/or expansion loop, not illustrated in any detail, for compensating for relative movements between the capacitor 300 and the rest of the setting tool 10. In exemplary embodiments which are not shown, a further damping element is arranged on the capacitor, for example on the end side of the capacitor that faces away from the holder. The capacitor is then preferably clamped between two damping elements, that is to say the damping elements bear against the capacitor with pretension. In further exemplary embodiments which are not shown, the connecting lines have a rigidity which continuously decreases as the distance from the capacitor increases.

FIG. 2 Illustrates a longitudinal section (on the left in FIG. 2) and a cross section (on the right in FIG. 2) through a setting tool 400 in the form of details. The setting tool 400 has a drive-in element 410 which is driven by a drive which comprises an excitation coil 420 and a soft-magnetic frame 430. In this case, the excitation coil 420 is preferably embedded in the frame 430 without play. In a ready-to-set position of the drive-in element 410, the drive-in element 410 enters a ring-like recess, not shown in any more detail, of the frame 430. If electrical current then flows through the excitation coil 420, for example due to a discharge of a capacitor, the drive-in element is repelled by the coil and accelerated along a setting axis $A_2$ (to the left in FIG. 2) in order to carry out a driving-in process. In this case, forces which are directed radially outward with respect to the setting axis $A_2$ also act on the excitation coil 420. In order to support the frame 430, in particular a radially outer region of the frame 430, against such forces, the setting tool 400 has a supporting structure 440, which encloses the frame 430 on an outer circumference of the frame 430 with respect to the setting axis $A_2$.

At least while current is flowing through the excitation coil 420, the supporting structure 440 exerts on the soft-magnetic frame 430 a pretensioning force that is directed radially inward with respect to the setting axis $A_2$. The pretensioning force acts radially inwardly on the soft-magnetic frame 430 from all sides within a plane perpendicular to the setting axis $A_2$. For this purpose, the frame 430 has a lateral surface 435 facing radially outward with respect to the setting axis $A_2$ and the supporting structure 440 has a supporting surface 445 facing radially inward with respect to the setting axis $A_2$. The supporting surface 445 lies flat against the lateral surface 435, so that the pretensioning force is transferred from the supporting surface 445 onto the lateral surface 435. The lateral surface 435 and the supporting surface 445 have a circular-cylindrical shape. The supporting structure 440 has at the end face an end region 450 which exerts on the frame 430 a pretensioning force in the direction of the setting axis $A_2$. The end region 450 at the end face is formed in one piece with the remaining supporting structure 440.

The supporting structure 440 consists of steel or ceramic and is produced with a recess into which the frame 430 is inserted with the excitation coil 420. The recess has a slight undersize with respect to the frame 430, so that the supporting structure 440 is elastically stretched in the peripheral direction with respect to the setting axis $A_2$ during the insertion or pressing in or thermal joining of the frame 430. This elastic stretching brings about the pretensioning force. In exemplary embodiments which are not shown, the supporting structure consists of plastic and is for example produced by means of an injection-molding process. The plastic preferably contains reinforcing fibers of carbon or glass. In a particularly preferred production process, long fibers are wrapped around the frame, pretensioned and extrusion-coated in the tensioned state. After hardening, the material maintains the pretensioned state of the long fibers, and thus the pretensioning force exerted on the frame. In further exemplary embodiments which are not shown, the soft-magnetic frame is of a multi-part form, for example consisting of a number of circular segments.

FIG. 3 Illustrates a longitudinal section (on the left in FIG. 3) and a cross section (on the right in FIG. 3) through a setting tool 500 in the form of details. The setting tool 500 has a drive-in element 510 and a drive with an excitation coil 520 and a soft-magnetic frame 530. In addition, the setting tool 500 comprises a supporting structure 540, which has a supporting surface 545. The supporting surface 545 bears against a lateral surface 535 of the frame 530, so that the supporting structure 540 encloses the frame 530.

The supporting structure 540 exerts on the soft-magnetic frame 530 a pretensioning force directed radially inward with respect to a setting axis $A_3$. The supporting structure 540 has at the end face an end region 550 which exerts on the frame 530 a pretensioning force in the direction of the setting axis $A_3$. The end region 550 at the end face is connected as a separate element to the remaining supporting structure 540.

FIG. 4 Illustrates a side view (on the left in FIG. 4) and a plan view (on the right in FIG. 4) of a supporting structure 640 with a setting axis $A_4$. The supporting structure 640 is formed in the manner of a pipe clamp and encloses a soft-magnetic frame 630. The supporting structure is tensioned around the frame 630 by means of a tensioning element 660, formed as a screw, while forming a pretensioning force. A supporting surface 645 of the supporting structure 640 bears against a lateral surface 635 of the frame 630, so that the pretensioning force is transferred from the supporting surface 645 onto the lateral surface 635.

FIG. 5 Illustrates a longitudinal section (in the middle and on the left in FIG. 5) and a cross section (on the right in FIG. 5) through a setting tool 700 in the form of details. The setting tool 700 has a drive-in element 710 and a drive with an excitation coil 720 and a soft-magnetic frame 730. In addition, the setting tool 700 comprises a supporting structure 740, which has a supporting surface 745. The supporting surface 745 bears against a lateral surface 735 of the frame 730, so that the supporting structure 740 encloses the frame 730. The supporting structure 740 exerts on the soft-magnetic frame 730 a pretensioning force directed radially inward with respect to a setting axis $A_5$.

The lateral surface 735 and the supporting surface 745 taper conically in a direction away from the drive-in element 710, so that repulsive forces, which act on the excitation coil 720 and thus on the frame 730, reinforce the pretensioning force between the lateral surface 735 and the supporting surface 745. The conical shape of the lateral surface 735 and the supporting surface 745 has a cone opening angle of for example 20°.

FIG. 6 illustrates a longitudinal section through a supporting structure 840. The supporting structure 840 has a supporting element 841 with a supporting surface 845, which bears against a lateral surface 835 of a frame 830. The lateral surface 835 and the supporting surface 845 are conical. The supporting structure further comprises a tensioning device 870 with a bracket 880 and a clamping element 890 formed as a screw. The tensioning device 870 pretensions the supporting structure 840 axially with respect to a setting axis $A_6$ against the frame 830, in that the frame 830 and the supporting element 841 are clamped between the clamping element 890 and the bracket 880. This clamping force generates a pretensioning force between the lateral surface 835 and the supporting surface 845, so that the frame 830 is supported with respect to radially outwardly acting forces.

The invention has been described using a series of exemplary embodiments that are illustrated in the drawings and exemplary embodiments that are not illustrated. The individual features of the various exemplary embodiments are applicable individually or in any desired combination with one another, provided that they are not contradictory. It should be noted that the setting tool according to the invention can also be used for other applications.

The invention claimed is:

1. A setting tool for driving fastening elements into a substrate, comprising a holder for holding a fastening element; a drive-in element for transferring the fastening element held in the holder into the substrate along a setting axis; and, a drive for driving the drive-in element toward the fastening element along the setting axis, wherein the drive comprises an electrical capacitor; a short-circuit runner arranged on the drive-in element; and, an excitation coil, wherein current flows through the excitation coil during discharge of the capacitor and the excitation coil generates a magnetic field that accelerates the drive-in element toward the fastening element, wherein the setting tool further comprises a soft-magnetic frame, in which the excitation coil is embedded; and, a supporting structure, wherein, at least during the discharge of the capacitor, the supporting structure exerts on the soft-magnetic frame a pretensioning force that is directed radially inward with respect to the setting axis, wherein the supporting structure substantially encloses the soft-magnetic frame, and wherein the supporting structure is elastically stretched in a peripheral direction with respect to the setting axis.

2. The setting tool as claimed in claim 1, wherein the supporting structure exerts a pretensioning force on the soft-magnetic frame from all sides within a plane perpendicular to the setting axis.

3. The setting tool as claimed in claim 1, wherein the supporting structure exerts a pretensioning force on the soft-magnetic frame in a direction of the setting axis.

4. The setting tool as claimed in claim 1, wherein the supporting structure is molded onto the soft-magnetic frame.

5. The setting tool of claim 1, wherein the supporting structure is elastically stretched in the peripheral direction with respect to the setting axis by inserting the soft-magnetic frame into a recess in the supporting structure.

6. A setting tool for driving fastening elements into a substrate, comprising a holder for holding a fastening element; a drive-in element for transferring the fastening element held in the holder into the substrate along a setting axis; and, a drive for driving the drive-in element toward the fastening element along the setting axis, wherein the drive comprises an electrical capacitor; a short-circuit runner arranged on the drive-in element and, an excitation coil, wherein current flows through the excitation coil during discharge of the capacitor and the excitation coil generates a magnetic field that accelerates the drive-in element toward the fastening element, wherein the setting tool further comprises a soft-magnetic frame, in which the excitation coil is embedded; and, a supporting structure, wherein, at least during the discharge of the capacitor, the supporting structure exerts on the soft-magnetic frame a pretensioning force that is directed radially inward with respect to the setting axis, wherein the soft-magnetic frame has a lateral surface facing radially outward with respect to the setting axis and the supporting structure has a supporting surface facing radially inward with respect to the setting axis, which lies flat against the lateral surface, the pretensioning force being transferred from the supporting surface onto the lateral surface, and wherein the lateral surface and the supporting surface are cylindrical.

7. The setting tool as claimed in claim 6, wherein a material of the supporting structure comprises a metal or an alloy.

8. The setting tool as claimed in claim 6, wherein a material of the supporting structure comprises ceramic.

9. The setting tool as claimed in claim 6, wherein a material of the supporting structure comprises a plastic.

10. The setting tool of claim 6, comprising a hand-held setting tool.

11. The setting tool of claim 6, wherein the lateral surface and the support surface are circular-cylindrical.

12. A setting tool for driving fastening elements into a substrate, comprising a holder for holding a fastening element; a drive-in element for transferring the fastening element held in the holder into the substrate along a setting axis; and, a drive for driving the drive-in element toward the fastening element along the setting axis, wherein the drive comprises an electrical capacitor; a short-circuit runner arranged on the drive-in element and, an excitation coil, wherein current flows through the excitation coil during discharge of the capacitor and the excitation coil generates a magnetic field that accelerates the drive-in element toward the fastening element, wherein the setting tool further comprises a soft-magnetic frame, in which the excitation coil is embedded; and, a supporting structure, wherein, at least during the discharge of the capacitor, the supporting structure exerts on the soft-magnetic frame a pretensioning force that is directed radially inward with respect to the setting axis, wherein the soft-magnetic frame has a lateral surface facing radially outward with respect to the setting axis and the supporting structure has a supporting surface facing radially inward with respect to the setting axis, which lies flat against the lateral surface, the pretensioning force being transferred from the supporting surface onto the lateral surface, and wherein the lateral surface and the supporting surface are conical.

13. The setting tool as claimed in claim 12, wherein the lateral surface and the supporting surface taper in a direction away from the drive-in element.

14. The setting tool as claimed in claim 13, wherein the conical shape of the lateral surface and the supporting surface has a cone opening angle of at most 90°.

15. The setting tool as claimed in claim 12, wherein the conical shape of the lateral surface and the supporting surface has a cone opening angle of at most 90°.

16. The setting tool of claim 15, wherein the conical-shape of the lateral surface and the supporting surface has a cone opening angle of at most 60°.

17. The setting tool as claimed in claim 12, wherein the setting tool comprises a tensioning device, which pretensions the supporting structure axially with respect to the setting axis against the soft-magnetic frame.

* * * * *